United States Patent [19]

Stanley

[11] 3,750,044

[45] July 31, 1973

[54] GRAPHIC EQUALIZER CIRCUIT

[75] Inventor: Gerald R. Stanley, Mishawaka, Ind.

[73] Assignee: International Radio & Electronics Corporation, Elkhart, Ind.

[22] Filed: May 22, 1972

[21] Appl. No.: 255,428

[52] U.S. Cl. .................. 330/126, 330/151, 330/107, 333/28 R

[51] Int. Cl. .............................................. H03f 3/68

[58] Field of Search .................... 330/151, 126, 107, 330/109; 333/28 T, 28 R

[56] References Cited

UNITED STATES PATENTS 2,907,838 10/1959 Ross ................................ 333/28 R

*Primary Examiner*—Roy Lake
*Assistant Examiner*—James B. Mullins
*Attorney*—Foorman L. Mueller et al.

[57] ABSTRACT

A graphic equalizer system for an audio amplifier system includes an input circuit for adjusting bass and treble boost and the corner frequencies thereof. The input circuit is coupled to a graphic equalizer network which in one branch includes a main amplifier connected between input and output terminals. Another branch includes a resistive voltage divider connected in series between input and output terminals and having multiple outputs for connection by a crossbar switch to any of a plurality of tuned active filter circuits each of which is tunable to a different frequency. The outputs of the filter circuits are coupled to a summing amplifier for connection to the input of the main amplifier of the graphic equalizer network.

13 Claims, 2 Drawing Figures

GRAPHIC EQUALIZER CIRCUIT

BACKGROUND OF THE INVENTION

Filters used to provide frequency boost or cut for particular frequency ranges have been utilized in audio amplifier systems to compensate for response irregularities of room loudspeaker systems. The filters have been adjusted to provide essentially a flat response, or in other words a uniform gain over the full range of amplified signals.

In the past graphic equalizers used to increase or decrease the amplification of audio amplifiers at predetermined frequencies have been popularly constructed of passive components. One form of circuit involved a parallel transmission scheme which divided the frequency spectrum into bands and summed the outputs of adjustable attenuators connected to bandpass filters. However, such devices suffered from chronic amplitude response ripple in the operating passband and were generally incapable of producing large amounts of band rejection without complex filtering. A modified parallel transmission system utilized series LC tanks in parallel as shunt or series elements on a single attenuator. However, large amounts of control became impractical if symmetrical boost and cut responses were desired. In addition, such circuits were plagued with the problems of circuit designs requiring large value inductors.

Another form of equalizer uses a series transmission system with adjustable filters which may take the form of T-networks and permit an adjustable amount of band rejection, or they may be loosy networks providing boost or cut at a particular frequency. However, with band reject filters there is a problem of inability to provide boost relative to the remaining flat passband, and lossy network suffer from loss of signal which could require a following stage of amplification.

It has been found that in average rooms, the acoustics are such that the signals at each end of the audio spectrum, i.e., the signal frequency range, are attenuated relative to signals in the center of the audio spectrum. Consequently, bass signals and treble signals generally require more boost or amplification than the signals in the middle portion of the audio spectrum. A graphic equalizer filter circuit alone can provide a large amount of boost at particular frequencies, but to apply large amounts of bass and treble boosting with a graphic equalizer may result in chronic amplitude response ripple in the boosted passband which is not easily conformable to the corrections necessitated by room resonance without complex filtering.

SUMMARY OF THE INVENTION

It is an object of the present invention to provide improved graphic equalization, i.e., amplitude boost or cut at predetermined frequencies in an amplifier system.

It is another object of the present invention to vary the response range of graphic control.

It is another object of the present invention to provide graphic controls with adjustable center frequencies.

It is a further object of the present invention to provide variable bass and treble boost control in conjunction with graphic equalization.

It is still another object of the present invention to provide a graphic equalizer system with broad band bass boost at various corner frequencies and broad band treble boost control at various other corner frequencies.

It is still a further object of the present invention to provide variable broad band bass and treble boost at variable corner frequencies in conjunction with graphic equalization, with the broad band bass and treble boost being independent of the respective corner frequencies.

The graphic equalizer system translates signals through an input circuit to a graphic equalizer network. The input circuit is an adjustable feedback inverting amplifier utilizing a field-effect transistor coupled to a high gain operational amplifier which drives the output of the input circuit. The feedback circuit includes a variable resistor and capacitor in parallel which provide respectively for variable amplitude bass boost and a variable bass corner frequency. Another variable resistor and variable capacitor coupled in series to ground provide respectively for variable treble boost and a variable treble corner frequency.

The main signal branch of the equalizer network is formed by an operational amplifier connected as an unity gain inverting amplifier, the input of which is connected to the input circuit and the output of which is connected to the output of the equalizer circuit. The feedback path of the main amplifier is selected to cause the amplifier to have wide band unity inverting voltage gain in the absence of the remaining circuit connections of the equalizer circuit.

The graphic equalizer system also includes a plurality of active filter circuits each of which may include an operational amplifier as the active unit, capacitors, resistors and a variable resistor which controls the resonant frequency of the filter without altering the gain at the center frequency. Each of the filters may be tuned to a different frequency.

A matched pair of resistor networks forming a voltage divider are connected in series between the input circuit and the output of the graphic equalizer circuit forming a second branch and providing different feedback taps. These feedback taps are selectively connected by a crossbar switch to the filter circuits. More than one filter circuit may be simultaneously connected to the same tap of the switch, if desired.

A summing amplifier is connected to the outputs of all of the active filter circuits and supplies a composite output signal to the input of the main amplifier.

DETAILED DESCRIPTION

Figure 1:
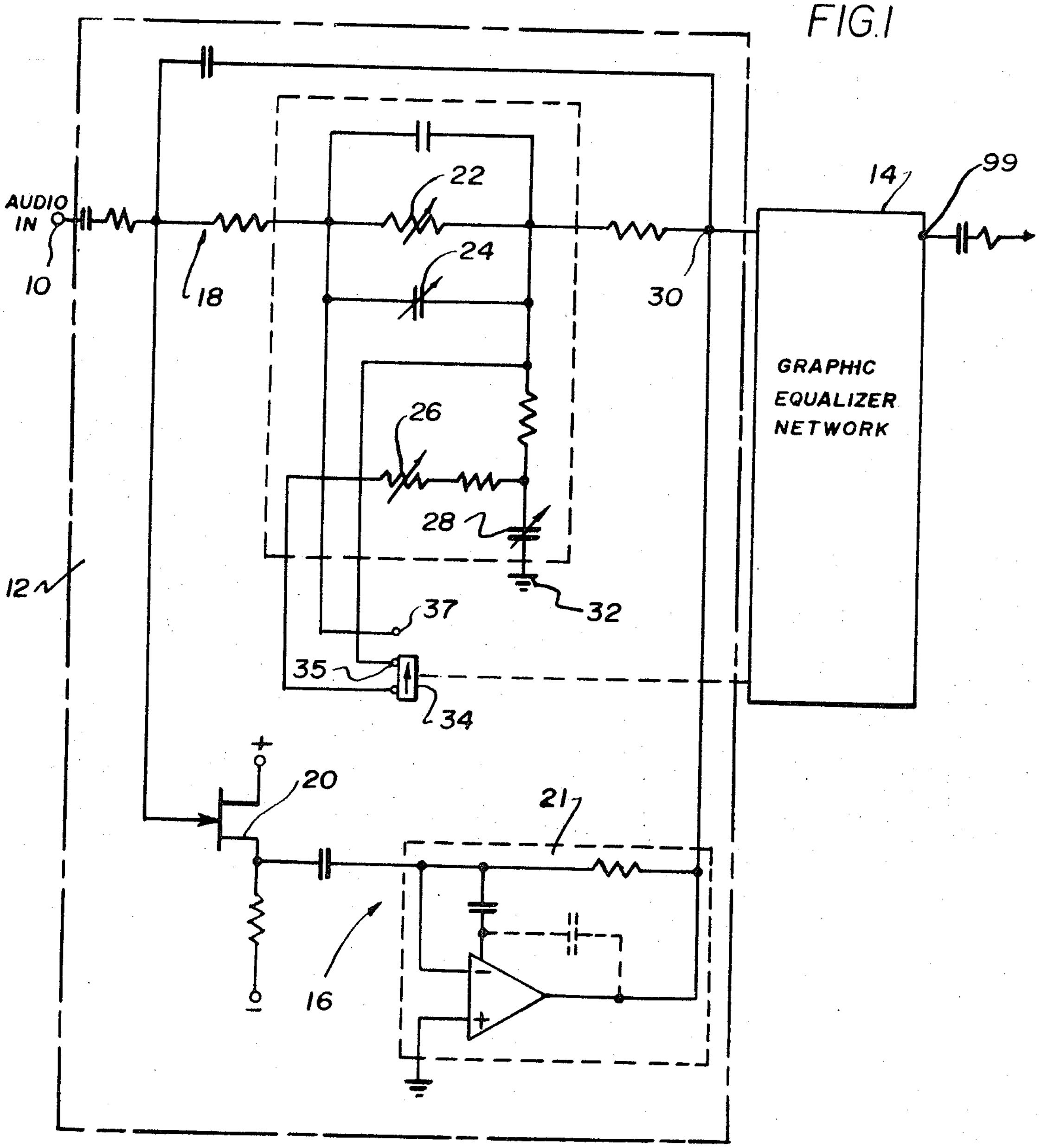
FIG. 1 is a circuit diagram of the graphic equalizer system showing the graphic equalizer network as a block.

Audio frequency signals at an input 10 of the graphic equalizer system are translated through an input circuit 12 to a graphic equalizer network 14. The input circuit selectively boosts the relatively broad bands of bass and treble frequencies and controls the corner frequency of each by adjusting the feedback through branch 18. A field-effect transistor 20 and amplifier 21 are feedback gain controlled by circuit branch 18 which includes variable resistor or rheostat 22 and variable capacitor 24 in parallel which provide respectively for variable amplitude boost for a broad band of bass frequencies and a variable corner frequency ranging generally from 50Hz to 500Hz. Variable resistor or rheostat 26 and variable capacitor 28 are coupled in series between the output terminal 30 and ground reference potential 32. They provide respectively for variable amplitude boost for the treble passband frequencies and a variable corner frequency ranging generally from 1.5Khz to 20Khz.

The input circuit 12, in a broad sense, provides coarse adjustment of the sound reproduced in a room to prevent high and low frequencies in the audio passband response from rolling off at the upper and lower (treble and bass) ends of the signal frequency range. The input circuit 12 is adjusted to boost rather than cut the amplitude. This is accomplished by reducing the feedback signals about the amplifier 21. The output signal thereof is then passed through output terminal 30 to the graphic equalizer network designated generally as 14.

Figure 2:
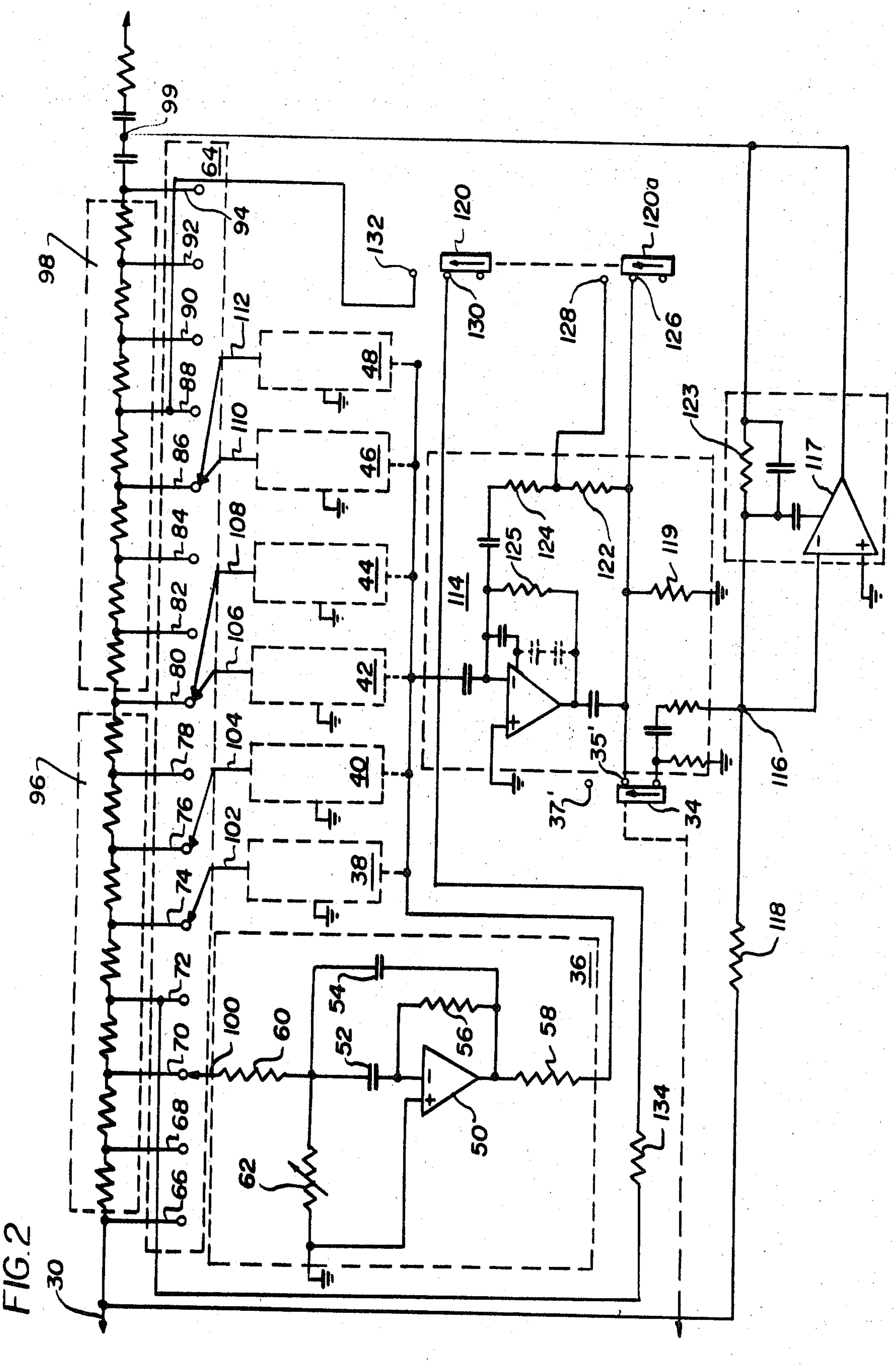
FIG. 2 is a schematic diagram of the graphic equalizer network for use in the system of FIG. 1.

The graphic equalizer network 14 is shown in circuit diagram form in FIG. 2. As used herein, a "graphic equalizer" is a sophisticated tone control array of three or more frequency bands whose boost-cut controls, by their settings, provide a visual (graphic) display of the frequency amplitude response of the equalizer. The main signal path for the equalizer network between input terminal 30 and output terminal 99 is through an operational amplifier 117, adjusted for unity inverting voltage gain by making input resistor 118 and feedback resistor 123 equal in value. As discussed previously, however, room-loudspeaker systems often attenuate (cut) or accentuate (boost) audio signals at particular frequencies so that opposing compensation is necessary at those frequencies. Unity gain across the audio spectrum from the amplifier 117 will not achieve this. The effective gain of the amplifier 117 must be varied selectively at different frequencies to provide the needed compensation. To do this, the graphic equalizer network 14 includes a plurality of active filter circuits 36, 38, 40, 42, 44, 46 and 48.

Filter 36 is representative of all the filter circuits and includes an inverting operational amplifier 50 as the active component, capacitors 52 and 54, resistors 56, 58 and 60 and variable resistor 62. A characteristic of the filter circuit is that the center, or resonant, frequency thereof is a function of the resistance of resistor 62, while the gain at the resonant frequency is not affected by the value of this resistance. Consequently, it is possible to tune the frequency of the filter 36 for optimum acoustic effect without changing the amplitude of the response, the tuning being accomplished with resistor 62. Each of the filters 36, 38, 40, 42, 44, 46 and 48 may be tuned to different center frequencies and have a relatively narrow passband compared to the full audio range of signals processed by the amplifier system of which the graphic equalizer is a part. The filters can thus respond for equalizing variations in the signal to eliminate undesirable ripples at different frequencies as may be found in many room loudspeaker systems.

A matched pair of voltage divider resistance networks 96 and 98, which may be in the form of Cermet pack resistors (Cermet is a trademark of CTS), are connected in series between input terminal 30 and output terminal 99 of the graphic equalizer network and provide outputs at taps 66, 68, 70, 72, 74, 76, 78, 80, 82, 84, 86, 88, 90, 92 and 94. These outputs or taps are selectively connected to the filter inputs 100, 102, 104, 106, 108, 110 and 112 by a crossbar switch 64, which may be of conventional construction, to permit any of the filter circuits 36 to 48 to be connected to any of the outputs 66 to 94 at any time. Several filter circuits may be simultaneously connected to the same output of the switch 64, if desired.

The individual resistors of the Cermet pack resistors 96 and 98 are symmetrically matched on opposite sides of the output tap 80 and provide symmetrical control of boost and cut in the graphic equalizer network response. For example, the terminal 80, located between the resistor packs 96 and 98, provides a zero decibel level of the boost or cut signal, i.e., no boost and no cut, since the total resistance of each of the resistor packs 96 and 98 is equal and the resistors 118 and 123 are equal. The voltage gain of the graphic equalizer network for the passband of frequencies for any of the filters 36, 38, 40, 42, 44, 46 or 48 is essentially equal to the amount of current fed forward to the operational amplifier 117 divided by the amount of current fed back at the particular frequency under consideration.

More specifically, the current fed forward to amplifier 117 is formed by the parallel combination (sum) of the circuit branch formed by the conductance of the resistor 118 and the effective transconductance of the branch formed by the equalizer control (resistor packs 96–98), the filter amplifier 36–48 effective at a given frequency, the mixer amplifier 114, and the conductance of the resistor 119. Mathematically, this transconductance can be expressed as:

(Forward voltage attenuation of the equalizer control at a given tap 66–94) × (Voltage gain of the filter amplifier) × (Voltage gain of the mixer amplifier) × (Conductance of 119)

The forward voltage attenuation of the equalizer control would be equal to the resistance of the control to the right of a given tap 66–94 to the output 99 divided by the total resistance of the packs 96–98 from 30 to 99.

The current fed back can be similarly described by exchanging the conductance of the resistor 123 for that of the resistor 118 and exchanging the reverse voltage attenuation of the equalizer control for the forward voltage attenuation.

The reverse voltage attenuation of the equalizer control at a given tap 66–94 is equal to the resistance of the control to the left of the tap to the input 30 divided by the total resistance of the packs 96–98 from 30 to 99.

Therefore, if the conductance of the resistor 118 is equal to the conductance of the resistor 123 and the forward voltage attenuation of the equalizer control is equal to the reverse voltage attenuation (both equal ½ for this example), the fed forward and fed back current amplitudes will be equal giving unity (OdB) gain.

As the input of a given filter is joined to taps nearer the input terminal 30 (72 is nearer than 74, etc.), the forward voltage attenuation is decreased and the reverse voltage attenuation equally increased with the net result of an increase in the ratio of fed forward to fed back current to the amplifier 117 giving an increase in gain (boost) at the respective filters operating frequency. When the input of a given filter is joined to taps nearer the output, the converse is true. The forward voltage attenuation is increased and the reverse voltage attenuation equally decreased with the net result of a decrease in the ratio of fed forward to fed back current to the amplifier 117 giving a decrease in gain (cut) at the operating frequency of the respective filter.

Terminal 78 may be set to provide a 2 decibel boost, terminal 76 a 4 decibel boost, terminal 74 a 6 decibel boost, terminal 72 a 9 decibel boost, terminal 70 a 12 decibel boost, terminal 68 a 16 decibel boost and terminal 66 a 20 decibel boost. The terminals 82, 84, 86, 88, 90, 92 and 94 provide the corresponding decibel cuts, or decreases.

The operational amplifier 114 forms a summer, and is connected to the outputs of all of the filters 36 to 48 of the graphic equalizer network, so the voltage inverted signal from the filters is again inverted to have a signal of the same polarity at junction 116 as the signal at the input of the filter networks. The signal at junction 116 provides the input to the main amplifier 117 which is connected to the output terminal 99, which may in turn be coupled to a further amplifier.

A range switch 120 permits switching from the full dB range of the equalizer to a fractional range if desired. The values of resistors 112, 124, 125, and 134 are selected to provide the desired range relationship. Switch 120 connects terminals 126 and 128, and 130 and 132, respectively, thereby changing the voltage gain of the summing amplifier 114 by shunting the resistor 122, and also connecting the high impedance resistor 134 across taps 72 and 88 of the boost/cut resistor dividers pack 96, 98. The values of these resistors for an actual circuit providing one-half range with switch 120, 120a in its upper position were:

| | |
|---|---|
| Resistor 122 | 330K Ω |
| Resistor 124 | 13K Ω |
| Resistor 125 | 47K Ω |
| Resistor 134 | 39K Ω |

Switch 34 connects the variable resistors 22 and 26 and the variable capacitors 24 and 28 in circuit (FIG. 1) when the switch is in the position shown. In a second position, with the switch 34 moved to connect terminals 35 and 37, the bass and treble boost circuits of FIG. 1 are bypassed, and consequently do not affect the signal between the input 10 and output 30. At the same time, when the switch 34 is in its upper position, the path between contact 35' (FIG. 2) and terminal 116 is broken and the graphic equalizer network is also disconnected from the amplifier 117.

What has been described, therefore, are effective means providing essential coarse and fine adjustment of an audio signal to compensate for varying characteristics of a room loudspeaker system.

I claim:

1. A graphic equalizer system for the signal range of an audio amplifier system having a signal translating path with an input and output including in combination: circuit means including a first variable element for adjusting the amplitude of a first band of frequencies having a corner frequency displaced from the center frequency of the signal range and a second variable element for adjusting said corner frequency of said first band, and a graphic equalizer network cascaded with said circuit means between the input and the output for adjusting the amplitude of selected frequencies of a narrower bandwidth than the band of frequencies of said first band.

2. The graphic equalizer system according to claim 1 wherein said circuit means includes a variable impedance connected to said signal translating path for controlling the amplitude of said first band of frequencies and variable capacitor means connected thereto for adjusting the corner frequency of the range of said first band of frequencies.

3. The graphic equalizer system according to claim 2 wherein said variable impedance comprises a variable resistor.

4. The graphic equalizer system according to claim 1 wherein said first variable element is a first variable impedance in said signal translating path for controlling the amplitude of said first band of frequencies, the same having a corner frequency below the center frequency of the signal range, said second variable element is a first variable capacitor coupled to said first variable impedance means for adjusting the corner frequency of said first band of frequencies, and said circuit means further including a second variable impedance coupled to said first variable impedance and first variable capacitor for controlling the amplitude of a second band of frequencies having a corner frequency above the center frequency of the signal range, and a second variable capacitor coupled to said second variable impedance for adjusting the corner frequency of said second band of frequencies.

5. The graphic equalizer system according to claim 1 wherein said graphic equalizer network includes a resistance voltage divider coupled between the input of said graphic equalizer network and the output of the system and having multiple outputs at various resistance values between said graphic equalizer network input and said output of the system, a plurality of filter circuits each having a different passband of frequencies of said narrower bandwidth, switch means for coupling the input of any of said filter circuits to any of said voltage divider outputs, amplifier means coupled between said input of said graphic equalizer network and the output of the system, feedback resistance means coupled between the output of the system and the input of said amplifier means, resistance means coupled between the input of said graphic equalizer network and the input of said amplifier means, and means coupled with the outputs of said filter circuits for combining the signals appearing thereon and applying such combined signals to the input of said amplifier means.

6. The graphic equalizer system according to claim 5 wherein said switch means comprises a crossbar switch.

7. The graphic equalizer system according to claim 5 wherein said filter circuits have adjustable center frequencies.

8. A graphic equalizer network having an input and an output and including in combination:

means for applying signals having a predetermined frequency range to the input of said graphic equalizer network;

amplifier means having an input and an output;

first impedance means coupled between the input of the graphic equalizer network and the input of said amplifier means, the output of said amplifier coupled with the output of the graphic equalizer network;

second feedback impedance means coupled between the output of said amplifier and the input thereof;

a resistive voltage divider coupled between the input of said graphic equalizer network and the output thereof and having multiple outputs at various resistance values between such graphic equalizer network input and output;

a plurality of active filter circuits each having a different passband of frequencies of a narrower bandwidth than said predetermined frequency range of signals applied to the input of said graphic equalizer network;

means for coupling the inputs of said active filter circuits to said voltage divider outputs; and means coupled with the outputs of said active filter circuits for combining the signals appearing thereon and applying such combined signals to the input of said amplifier means.

9. The combination according to claim 8 wherein said means for coupling the inputs of said filter circuits to said voltage divider outputs comprises a crossbar switch for coupling any such input to any of said voltage divider outputs.

10. The combination according to claim 9 wherein said voltage divider includes first and second sets of matched resistors connected in series between the input and output of the graphic equalizer network, with the total resistance of each of said sets equalling the total resistance of the other.

11. The combination according to claim 8 wherein said active filters have adjustable center frequencies.

12. The combination according to claim 11 wherein said means coupled with the outputs of said filter circuits for combining the signals appearing thereon comprises a summing amplifier, with the outputs of said filter circuits being coupled in common to the input of said summing amplifier and the output thereof being connected to the input of said amplifier means.

13. The combination according to claim 12 further including means for changing the gain of said summing amplifier.

* * * * *